R. G. DU BOIS & W. L. MEAD.
AUTOMOBILE.
APPLICATION FILED MAY 16, 1912. RENEWED APR. 30, 1914.

1,123,996.  Patented Jan. 5, 1915.

WITNESSES:
Reginald S. DuBois
Louis, Du Bois

INVENTORS
Rhesa G. DuBois
Winthrop L. Mead
BY
Rhesa G. DuBois
ATTORNEY

UNITED STATES PATENT OFFICE.

RHESA G. DU BOIS AND WINTHROP L. MEAD, OF SOUTH ORANGE, NEW JERSEY.

AUTOMOBILE.

1,123,996. Specification of Letters Patent. Patented Jan. 5, 1915.

Application filed May 16, 1912, Serial No. 697,599. Renewed April 30, 1914. Serial No. 835,544.

*To all whom it may concern:*

Be it known that we, RHESA G. DU BOIS and WINTHROP L. MEAD, citizens of the United States, residing at South Orange, in the county of Essex and State of New Jersey, have invented certain new and useful Improvements in Automobiles, of which the following is a specification.

This invention relates to a safety attachment for those automobiles propelled by a gas engine wherein the explosive mixture is ignited by an electric spark; and an object of the invention is to produce a device which will make it impossible for the operator to prematurely start the engine as when the gears are in mesh and the car is standing still.

To this end, the invention consists in the peculiar features and combinations of parts which will be more fully described hereinafter and pointed out in the claims.

Figure 1:
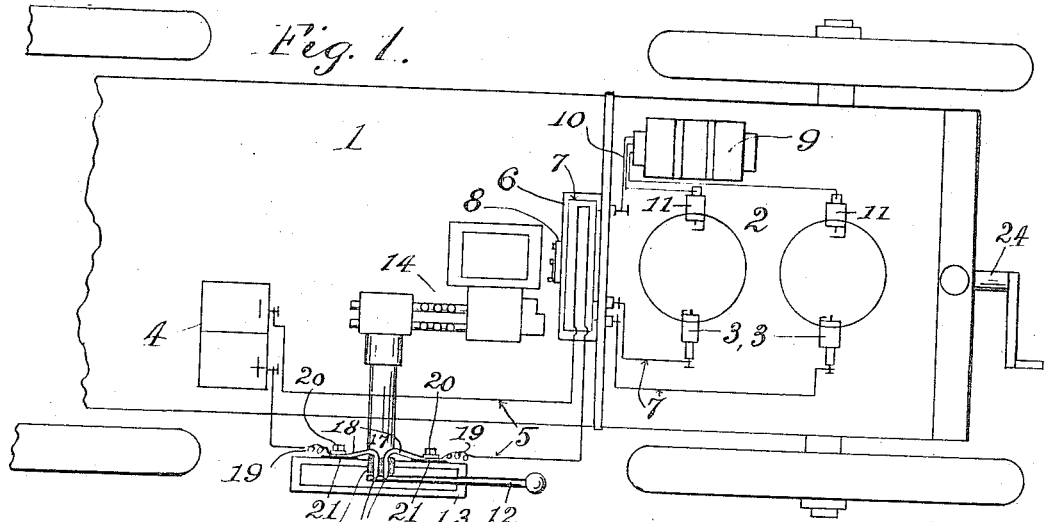
Figure 2:
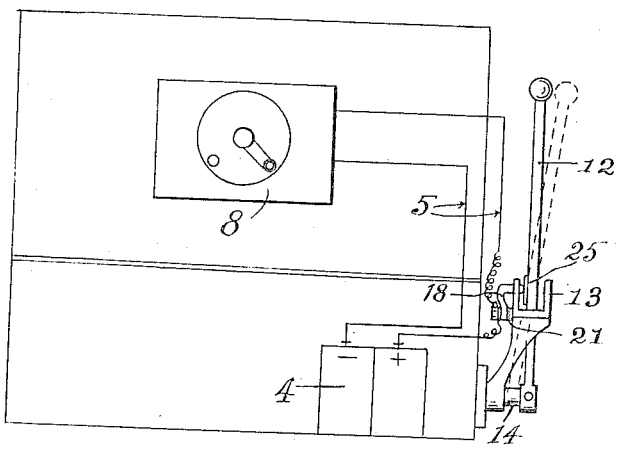
Figure 3:
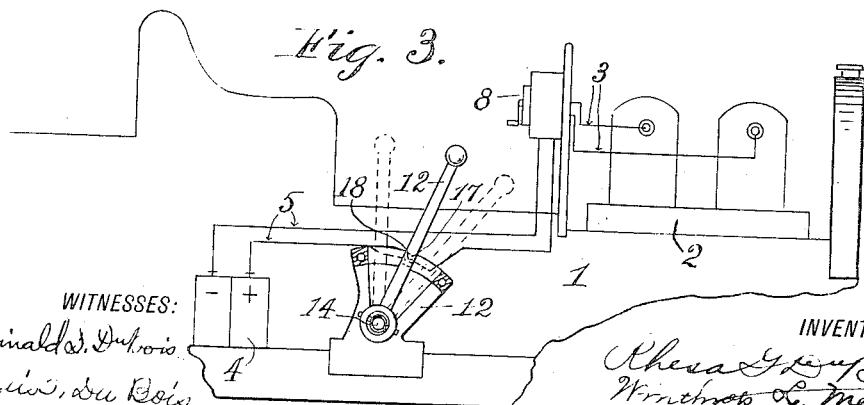

In the accompanying drawings Figure 1 is a diagrammatic plan view of the invention as applied to a common type of gasolene automobile. Fig. 2 a detail view of a front elevation showing the manner of applying the wire connections to the dash board and operating lever bracket. Fig. 3 a side view of an automobile in outline and of the shifting lever and its bracket, and the wire connections, part of the bracket being shown in section to better disclose the lever.

In starting a gasolene car from a standstill, the transmission gears should always be out of mesh so that the engine and not the car will be thrown into action, after which the gears may be coupled or meshed, whenever sliding gears are used, and the clutch let in, thereby connecting the power with the driving wheels. Therefore, if the engine is started the gear shifting lever should stand at the neutral point whereby the action of the engine will not start the car. It often happens in starting an engine that the shifting lever is accidentally left in connected adjustment, and when such an error is made and the engine started either on compression, as by turning on the battery switch or by cranking when the battery is on, the car will start with the engine and serious injury may follow. To prevent such an accident, we have devised means which automatically and mechanically break or cut out the sparking circuit of the engine whenever the transmission gears are connected, and vice-versa.

The invention might be carried out in a variety of ways, but for purposes of illustration, we have shown it as applied to an ordinary two-cylinder gas engine provided with dual ignition wherein the reference numeral 1 denotes, in outline, the body of an automobile, and 2 the engine mounted therein.

3, 3 are spark plugs fired by the electricity from a battery 4 through a primary circuit 5 in connection with a coil 6, having a secondary circuit 7, and a switch 8 all of which may be of any well-known form and need not be described in detail. This battery circuit is generally used only for starting the engine after which it is switched off and magneto 9 switched on for steady running, thus saving the battery. 10 represents any suitable magneto wires leading from the switch 8 to the spark plugs 11. The shifting lever 12 confined within a bracket 13, operates the transmission 14 and also serves as a switch to make and break the primary circuit 5 and hence cause the production of electrical impulses in secondary circuit 7, for firing plugs 3—3, or to prevent such action. This is done by a circuit breaker in the primary circuit between the battery 4 and coil 6. A gap 17 is provided at the point on the bracket 13 where the shifting lever stands at "neutral", by the employment of two spring electrical contacts 18 which form a part of the primary circuit 5 and are attached at 19 to the side of the bracket by bolts 20 and insulators 21. The contiguous ends 22 of the contacts are hook-shaped and pass through insulation 23. These or any other suitable means to insulate the circuit may be employed.

24 is a starting crank; and 25 a metal contact plate carried on the lever.

Thus constructed, the operation of the device is as follows: Whenever the gear shifting lever 12 stands at "neutral" as seen in Fig. 3 and the switch turned to battery, the electrical connections are complete and the transmission gears are out of mesh, and the engine ready to be safely started by the crank 24 or on compression without starting the car. Should the lever be shifted from "neutral" into backward or forward adjustment to couple the gears, as seen in dotted lines in Fig. 3, the primary circuit 5 will be broken and the battery become inoperative and no spark will take place in the cylinders, and it would therefore be impossible for the battery to work.

After the engine has been started the battery should be switched off onto the magneto whereupon the operations or positions of the shifting lever will have no effect on the battery circuit.

It should be further explained that as the shifting lever is drawn up into neutral position to uncouple the sliding gears, or release the transmission, as the case may be, it comes in contact with and slides over the rounded points of the contacts 18, pushing them back until both are on the plate 25 and the circuit is completed.

Having thus described our invention, what we claim and desire to secure by Letters Patent is:

1. In an internal-combustion-engine automobile having the usual transmission system, and a dual ignition system composed of a battery circuit and a magneto circuit, the combination with the shifting lever, of a contact device actuated by the lever, whereby the battery circuit is broken whenever the transmission mechanism is thrown into operative adjustment and vice versa.

2. In a motor vehicle of the internal-combustion-engine type, a transmission system including gear shifting means, an ignition system for said engine embodying a normally open battery circuit on which the engine is started and a magneto circuit on which the engine is normally operated after starting, and a switch controlled by said gear shifting means for closing said battery circuit only when the gears are at neutral.

3. In a motor vehicle of the internal-combustion-engine type, the combination of transmission mechanism including means for throwing said transmission into and from operative adjustment; an ignition system for said engine embodying a generator circuit on which the engine is adapted to be operated after being started and a battery circuit adapted to be used in starting the engine and means for throwing the generator circuit into action after the engine has been started; and means for maintaining said battery circuit open when the transmission is in operative adjustment and for automatically closing said battery circuit for starting the engine thereon when the transmission is in inoperative adjustment.

4. A safety device for motor vehicles comprising an ignition system embodying a battery on which the engine is adapted to be started and a generator adapted to operate the ignition system after the engine has been started, the circuit including said battery being normally open, and means controlled by the speed lever of said motor vehicle when at its neutral position for closing said circuit to permit starting of the engine on said battery.

5. In a motor vehicle of the internal combustion engine type, the combination of the sparking and transmission mechanisms, the sparking mechanism embodying a battery on which the engine is started and a magneto for operating the sparking system after the engine is running, of devices in connection with the transmission shifting mechanism for breaking the circuit including said battery whenever the transmission mechanism is in operative adjustment.

6. In an internal-combustion-engine driven motor vehicle having transmission mechanism and devices controlling the same, an ignition system comprising a battery on which the engine is started and a magneto on which the engine is operated after running, said system including an electric switch controlled by said devices to break the circuit including said battery except when the transmission is in neutral or inoperative adjustment.

7. In an internal-combustion-engine driven motor vehicle having transmission mechanism and devices controlling the same, an ignition system comprising a battery on which the engine is started and a magneto for operating the engine after the same has been started, an electric switch mechanism controlled by said devices to break the circuit including said battery when the transmission is in operative adjustment.

8. In an internal-combustion-engine driven motor vehicle having transmission mechanism and devices controlling the same, and an ignition system including a battery circuit on which the engine is started and a generator circuit on which the engine is operated after having been started, said starting circuit being controlled by said devices to be out of action when the transmission is in operative adjustment and to be closed for starting the engine when the transmission is in inoperative adjustment.

In testimony whereof, we have hereunto signed our names to this specification in the presence of two subscribing witnesses, this 14th day of May 1912.

RHESA G. DU BOIS.
WINTHROP L. MEAD.

Witnesses:
GEO. GARRABRANT,
HORACE J. MURRAY.